United States Patent
Moman et al.

(10) Patent No.: US 9,175,100 B2
(45) Date of Patent: Nov. 3, 2015

(54) PROCESS FOR MAKING A SOLID CATALYST COMPONENT FOR ETHYLENE POLYMERIZATION AND COPOLYMERIZATION

(75) Inventors: Akhlaq Moman, Riyadh (SA); Atieh Aburaqabah, Riyadh (SA); Abdullah Mohammed Al-Obaid, Riyadh (SA); Moughrabiah Wajeeh, Riyadh (SA); Salaheldin Habibi, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 98 days.

(21) Appl. No.: 13/989,641

(22) PCT Filed: Nov. 17, 2011

(86) PCT No.: PCT/EP2011/005761
§ 371 (c)(1),
(2), (4) Date: May 24, 2013

(87) PCT Pub. No.: WO2012/069157
PCT Pub. Date: May 31, 2012

(65) Prior Publication Data
US 2013/0245218 A1    Sep. 19, 2013

(30) Foreign Application Priority Data
Nov. 26, 2010    (EP) .................................... 10015019

(51) Int. Cl.
| | | |
|---|---|---|
| C08F 4/50 | (2006.01) |
| C08F 4/52 | (2006.01) |
| C08F 10/02 | (2006.01) |
| C08F 110/02 | (2006.01) |
| C08F 210/16 | (2006.01) |

(52) U.S. Cl.
CPC ... *C08F 4/50* (2013.01); *C08F 4/52* (2013.01); *C08F 10/02* (2013.01); *C08F 110/02* (2013.01); *C08F 210/16* (2013.01)

(58) Field of Classification Search
None
See application file for complete search history.

(56) References Cited

U.S. PATENT DOCUMENTS

| | | |
|---|---|---|
| 4,302,565 A | 11/1981 | Goeke et al. |
| 4,302,566 A | 11/1981 | Karol et al. |
| 4,558,024 A | 12/1985 | Best |
| 5,145,821 A | 9/1992 | Buehler et al. |
| 5,260,245 A | 11/1993 | Mink et al. |
| 5,344,803 A | 9/1994 | Menon et al. |
| 5,346,872 A | 9/1994 | Menon et al. |
| 5,424,263 A | 6/1995 | Buehler |
| 5,470,812 A | 11/1995 | Mink et al. |
| 5,561,091 A | 10/1996 | Mink et al. |
| 6,096,678 A * | 8/2000 | Ray et al. .................. 502/152 |

FOREIGN PATENT DOCUMENTS

| | | |
|---|---|---|
| EP | 0032309 A2 | 7/1981 |
| EP | 0173470 A2 | 3/1986 |
| EP | 0184347 A2 | 6/1986 |
| EP | 0244678 A1 | 11/1987 |
| EP | 1052266 A1 | 11/2000 |
| WO | 9117190 A1 | 11/1991 |
| WO | 9309147 A1 | 5/1993 |
| WO | 9516714 A1 | 6/1995 |
| WO | 9905187 A1 | 2/1999 |

OTHER PUBLICATIONS

Extended European Search Report; European Application No. 10015019.2; Date of Mailing: Apr. 19, 2011; 6 Pages.
Fripiat et al.; "Hydroxyl Content in Silica Gel 'Aerosil'"; Journal of Physical Chemistry; vol. 66, Issue 5; 1962; pp. 800-805.
International Search Report; International Application No. PCT/EP2011/005761; International Filing Date: Nov. 17, 2011; Date of Mailing: Jan. 25, 2012; 4 Pages.
Written Opinion of the International Searching Authority; International Application No. PCT/EP2011/005761; International Filing Date: Nov. 17, 2011; Date of Mailing: Jan. 25, 2012; 6 Pages.
Pullukat et al.; "Silica-Based Ziegler-Natta Catalysts: A Patent Review"; Catal. Rev.—Sci. Eng.; vol. 41, Nos. 3 & 4; 1999; pp. 389-428.

* cited by examiner

*Primary Examiner* — Ling Choi
*Assistant Examiner* — Catherine S Branch
(74) *Attorney, Agent, or Firm* — Cantor Colburn LLP

(57) ABSTRACT

The present invention relates to a process for preparing a solid catalyst component suitable for producing polyethylene and its copolymers, said process comprising the steps of: (a) contacting a dehydrated support having hydroxyl groups with a magnesium compound having the general formula $MgR^1R^2$; (b) contacting the product obtained in step (a) with modifying compounds (A), (B) and (C), wherein: (A) is at least one compound selected from the group consisting of carboxylic acid, carboxylic acid ester, ketone, acyl halide, aldehyde and alcohol; (B) is a compound having the general formula $R^{11}{}_f(R^{12}O)_g SiX_h$, (C) is a compound having the general formula $(R^{13}O)_4 M$, and (c) contacting the product obtained in step (b) with a titanium halide compound having the general formula $TiX_4$, wherein Ti is a titanium atom and X is a halide atom. The invention also relates to a solid catalyst component obtainable by said process. The invention further relates to a process for producing polyethylene and its copolymers in the presence of the solid catalyst component and a co-catalyst.

18 Claims, No Drawings

PROCESS FOR MAKING A SOLID CATALYST COMPONENT FOR ETHYLENE POLYMERIZATION AND COPOLYMERIZATION

CROSS REFERENCE TO RELATED APPLICATIONS

This application is a 371 of International Application No. PCT/EP2011/005761, filed Nov. 17, 2011, which claims priority to European Application No. 10015019.2, filed Nov. 26, 2010, both of which are hereby incorporated by reference in its entirety.

The present invention relates to a process for making a solid catalyst component suitable for polymerization and copolymerization of ethylene. The invention also relates to a solid catalyst component obtainable by said process. Furthermore, the invention relates to a process of polymerization and copolymerization of ethylene using said catalyst component.

Such process is known from document EP 0173470 A2. This document discloses a process for making a solid catalyst component for a supported Ziegler-Natta catalyst system suitable for ethylene and propylene (co-) polymerization. Said process comprises the steps of contacting a dehydrated support metal oxide of Group II, III or IV of the Periodic Table, e.g. silica; with an organomagnesium compound, e.g. dialkyl magnesium; and an alkoxy group-containing compound, e.g. an ortho-ester, represented by the formula $X_mC(OR)_{4-m}$, wherein X represents a hydrogen atom, a halogen atom or an alkyl group, R represents a hydrocarbyl group and m is 0, 1 or 2 to give a reaction product, which is then optionally contacted with a halogen-containing compound, e.g. $SiCl_4$; an electron-donating compound, e.g. carboxylic esters, carboxylic acids, carboxylic anhydrides, alcohols, ethers, ketones; and an organic aluminium compound or mixtures thereof prior to or subsequently to the contact of the reaction product with a titanium compound, e.g. $TiCl_4$ or tetrabutoxy titanium. The process for making the catalyst employed in EP 0173470 A2 requires use of excess catalyst components during catalyst preparation, solvent decanting and multiple solvent washings in each step of catalyst preparation. High levels of different solvents are used for each solvent washing, thus generating high levels of hazardous solvent waste material. The ethylene (co-)polymers obtained by employing the process disclosed in EP 0173470 A2 exhibited, for instance, a bulk density of 0.390 g/cm$^3$ and productivity of 321 g polymer/g·cat·hr·atm when $SiCl_4$ was additionally applied in the process.

Processes to prepare catalyst systems to be applied for producing polyethylene and its copolymers are generally known in the art. The essential components used in the preparation of such catalysts typically include a supported magnesium compound, a titanium compound supported thereon and an organoaluminium compound. Such catalysts are generally referred to in the art as supported Ziegler-Natta catalysts and an overview of such catalyst types is for example given by T. Pullukat and R. Hoff in Catal. Rev.—Sci. Eng. 41, vol. 3 and 4, 389-438, 1999.

U.S. Pat. No. 5,561,091 discloses a process for obtaining polyethylenes with narrow molecular weight distribution by employing the steps of (i) contacting a solid, porous carrier having reactive hydroxyl (OH) groups in a non-polar liquid with dialkylmagnesium, with the molar ratio of dialkylmagnesium to the OH groups of from 1.1 to 2.5 to form a product; (ii) introducing into the liquid containing said product of step (i) a mixture of $SiCl_4$ and an alcohol to form a slurry, with the molar ratio of $SiCl_4$ to Mg of 0.40 to 1.40, the molar ratio of the alcohol to magnesium of at least 1.32 and with a molar ratio between the alcohol and $SiCl_4$ of 2.00 to 6.00; and (iii) contacting the slurry of step (ii) with a transition metal compound selected from the group of titanium tetrachloride, titanium alkoxides, vanadium halides and vanadium alkoxides in a non-polar liquid medium to form a catalyst precursor, the transition metal compound being used in excess of the number of moles of hydroxyl groups on said carrier prior to reaction with dialkylmagnesium. The catalyst preparation disclosed in U.S. Pat. No. 5,561,091 is a complex process as it requires two separate vessels.

U.S. Pat. No. 4,558,024 discloses a process to obtain a catalyst precursor by contacting a solid, particulate, porous support material, e.g. silica with an organomagnesium compound, e.g. a dihydrocarbon magnesium compound; optionally an oxygen containing compound selected from alcohols, aldehydes, ketones, siloxanes or mixtures thereof; a Group IIIa metal hydrocarbyl dihalide, e.g. ethylaluminium dichloride; and titanium tetrachloride. It is known that organoaluminum chloride compounds are of a pyrophoric nature. High levels of ethylaluminium dichloride are used in catalyst preparation disclosed in U.S. Pat. No. 4,558,024. The process to obtain a catalyst precursor in U.S. Pat. No. 4,558,024 requires solvent decanting, solvent filtering and solvent washing during catalyst preparation. Such processes, especially due to the use of the organoaluminum chloride compound in catalyst precursor preparation, generate highly hazardous solvent waste material. Further, low catalyst productivity is obtained by employing the catalyst as described in this document.

A drawback of the process and the catalyst composition disclosed in EP 0173470 A2 is relatively low productivity of the catalyst and low bulk density of the polymer obtained in the polymerization process.

It is the object of the present invention to provide a process for preparing a solid polymerization catalyst component that shows a combination of higher productivity in ethylene polymerization and copolymerization process, higher bulk density and to allow control of the molecular weight distribution of the ethylene polymers and copolymers obtained by employing said process.

This object is achieved by the process for preparing a solid catalyst component suitable for producing polyethylene and its copolymers, said process comprising the steps of:

(a) contacting a dehydrated support having hydroxyl groups with a magnesium compound having the general formula $MgR^1R^2$, wherein $R^1$ and $R^2$ are the same or different and are independently selected from the group comprising an alkyl group, alkenyl group, alkadienyl group, aryl group, alkaryl group, alkenylaryl group and alkadienylaryl group;

(b) contacting the product obtained in step (a) with modifying compounds (A), (B) and (C), wherein:

(A) is at least one compound selected from the group consisting of carboxylic acid, carboxylic acid ester, ketone, acyl halide, aldehyde and/or alcohol;

(B) is a compound having the general formula $R^{11}_f(R^{12}O)_g SiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different and are independently selected from the group comprising an alkyl group, alkenyl group, alkadienyl group, aryl group, alkaryl group, alkenylaryl group and alkadienylaryl group;

(C) is a compound having the general formula $(R^{13}O)_4M$, wherein M is a titanium atom, a zirconium atom or a vanadium atom, O is an oxygen atom and $R^{13}$ is selected from the group comprising an alkyl group, alkenyl group, alkadienyl group, aryl group, alkaryl group, alkenylaryl group and alkadienylaryl group; and (c) contacting the product obtained in step (b) with a titanium halide compound having the general formula $TiX_4$, wherein Ti is a titanium atom and X is a halide atom.

It is an advantage of the present process that by employing a solid catalyst component that shows a combination of higher productivity and higher bulk density of ethylene polymers and copolymers is obtained by applying the process according to the present invention if, before being contacted with the titanium halide compound, the solid magnesium containing support is treated with modifying compounds (A), (B) and (C) that may be applied in any order or simultaneously. The obtained higher catalyst productivity and higher product bulk density ultimately reduces the catalyst costs in the production of ethylene polymers and copolymers. In addition, the higher catalyst productivity results in lower residual catalyst components, preventing discoloration and gel formation. The higher product bulk density results in increased production rates in, for example, a fluidized bed gas phase polymerization process and thus in lower polymer production costs. The higher product bulk density results also in a decreased frequency required for product removal from the reactor to maintain the reactor bed level, which leads to an increase in the efficiency of reactant gas conversion to product; easiness in controlling gas compositions in the polymerization reactor and easiness in controlling ethylene-based product quality.

Another advantage of the process according to the invention is that the molecular weight distribution, defined as a ratio of the weight average molecular weight (Mw) and the number average molecular weight (Mn), i.e. Mw/Mn determined by Gel Permeation Chromatography (GPC) of the product obtained is found to be readily varied, for example in the range of about 3 to about 9, by applying the solid catalyst components of the present invention, whilst maintaining a combination of high catalyst productivity and high bulk density. This control of molecular weight distribution allows controlled improvement in product properties as per specific requirements. Improved product mechanical properties are obtained with narrow molecular weight distribution product of about 3 to about 5, such as high stiffness and improved tensile properties of films and low shrinkage in injection moulded products. For applications which require improved product processability, broader molecular weight distribution product of about 5.5 to about 9 can be readily produced by the process according to the present invention.

Additional advantages of the process according to the present invention include improved mechanical properties of the obtained ethylene polymers and copolymers, particularly increased stiffness, resulting in improved conversion behaviour and efficiency; and increased impact resistance, tensile strength and tensile elongation. Moreover, an improvement of such properties allows for example down-gauging of the product and thus reduced material costs.

A further advantage of the process according to the present invention is improved optical properties, such as high gloss and increased clarity of the products obtained by applying the solid catalyst component in the process of the present invention. Also, lower level of small polymer particles ("fines") is obtained by applying the process of the present invention, which has the advantage of maintaining continuity of the polymerization process by preventing static formation, sheeting or fouling in the polymerization reactor.

Further advantages of the present invention is that the entire catalyst preparation process can be conducted in one vessel and that the solvent decanting, the solvent filtering and the solvent washing steps used in the prior art can be eliminated.

The process of the present invention for making the solid catalyst component for a supported Ziegler-Natta catalyst system suitable for producing ethylene polymers and copolymers comprises a first step (a) of contacting a dehydrated solid support having hydroxyl (OH) groups with a magnesium compound to form a solid magnesium containing support material.

The solid support according to the present invention is any material containing hydroxyl groups. Suitable examples of such materials include inorganic oxides, such as silica, alumina, magnesia, thoria, zirconia and mixtures of such oxides. Preferably, porous silica is used as the support according to the present invention as higher bulk densities and higher catalyst productivities are obtained therewith. Silica may be in the form of particles having a mean particle diameter of about 1 micron to about 500 microns, preferably from 5 microns to 150 microns and most preferably from 10 microns to 100 microns. Lower mean particle diameter produce a higher level of polymer fines and higher mean particle diameter reduces polymer bulk density. The silica may have a surface area of about 5 $m^2/g$ to about 1500 $m^2/g$, preferably from 50 $m^2/g$ to 1000 $m^2/g$ and a pore volume of from about 0.1 $cm^3/g$ to about 10.0 $cm^3/g$, preferably from 0.3 $cm^3/g$ to 3.5 $cm^3/g$, as higher catalyst productivity is obtained in this range.

The dehydrated solid support can be obtained by drying the solid support in order to remove physically bound water and to reduce the content of hydroxyl groups to a level which may be of from about 0.1 mmol to about 5.0 mmol hydroxyl groups per gram of support, preferably from about 0.2 mmol to about 2.0 mmol hydroxyl groups per gram of support, as this range allows sufficient incorporation of the active catalyst components to the support, determined by the method as described in J. J. Fripiat and J. Uytterhoeven, J. Phys. Chem. 66, 800, 1962 or by applying $^1H$ NMR spectroscopy. The hydroxyl groups content in this range may be achieved by heating and fluidizing the support at a temperature of from about 150° C. to about 900° C. for a time of about 1 hour to about 15 hours under a nitrogen or air flow. The dehydrated support can be slurried, preferably by stirring, in a suitable hydrocarbon solvent in which the individual catalyst components are at least partially soluble. Examples of suitable hydrocarbon solvents include n-pentane, isopentane, cyclopentane, n-hexane, isohexane, cyclohexane, n-heptane, isoheptane, n-octane, isooctane and n-decane. The amount of solvent used is not critical, though the solvent should be used in an amount to provide good mixing of the catalyst components.

The magnesium compound is represented by the general formula $MgR^1R^2$, wherein $R^1$ and $R^2$ are the same or different and are independently selected from a group comprising an alkyl group, alkenyl group, alkadienyl group, aryl group, alkaryl group, alkenylaryl group and an alkadienylaryl group and may have from 1 to 20 carbon atoms. Suitable examples of the magnesium compound include dimethylmagnesium, diethylmagnesium, ethylmethylmagnesium, di-n-propylmagnesium, diisopropylmagnesium, n-propylethylmagnesium, isopropylethylmagnesium, di-n-butylmagnesium, diisobutylmagnesium, n-butylethylmagnesium, n-butyl-n-propylmagnesium, n-butylisopropylmagnesium, isobutylethylmagnesium, isobutyl-n-propylmagnesium, isobutylisopropylmagnesium, di-n-pentylmagnesium, diisopentylmagnesium, n-pentylethylmagnesium, n-pentyl-n-propylmagnesium, n-pentylisopropylmagnesium, n-pentyl-n-butylmagnesium, n-pentylisobutylmagnesium, di-n-hexylmagnesium, diisohexylmagnesium, n-hexylethylmagnesium, n-hexyl-n-propylmagnesium, n-hexylisopropyl magnesium, n-hexyl-n-butylmagnesium, n-hexylisobutylmagnesium, isohexylethylmagnesium, isohexyl-n-propylmagnesium, isohexylisopropyl magnesium, isohexyl-n-butylmagnesium, isohexylisobutylmagnesium, di-n-octylmagnesium, diisooctylmagnesium, n-octylethylmagnesium, n-octyl-n-propylmagnesium, n-octylisopropylmagnesium, n-octyl-n-butylmagnesium, n-octylisobutyl magnesium, isooctylethylmagnesium, isooctyl-n-propylmagnesium, isooctylisopropylmagnesium, isooctyl-n-butylmagnesium, isooctylisobutyl magnesium, dicyclopentylmagnesium, cyclopentylethylmagnesium, cyclopentyl-n-propylmagnesium, cyclopentylisopropylmagnesium, cyclopentyl-n-butylmagnesium, cyclopentylisobutylmagnesium, dicyclohexylmagnesium, cyclohexylethylmagnesium, cyclohexyl-n-propylmagnesium, cyclohexylisopropyl magnesium, cyclohexyl-n-butylmagnesium, cyclohexylisobutylmagnesium, diphenylmagnesium, phenylethylmagnesium, phenyl-n-propylmagnesium, phenyl-n-butylmagnesium and mixtures thereof.

Preferably, the magnesium compound is selected from the group comprising di-n-butylmagnesium, n-butylethylmagnesium and n-octyl-n-butylmagnesium.

The magnesium compound can be used in an amount ranging from about 0.01 to about 10.0 mmol per gram of solid support, preferably from about 0.1 to about 3 5 mmol per gram of support and more preferably from 0.3 to 2 5 mmol per gram of support as by applying this range the level of polymer fines of the product is reduced and higher catalyst productivity is obtained. The magnesium compound may be reacted, preferably by stirring, with the support at a temperature of about 15° C. to about 140° C. during about 5 minutes to about 150 minutes, preferably at a temperature of about 20° C. to 80° C. for a duration of 10 minutes to 100 minutes.

The molar ratio of Mg to OH groups in the solid support applied in the process according to the present invention can be in the range of about 0.01 to about 10.0, preferably of from about 0.1 to about 5.0 and more preferably of from about 0.1 to about 3.5, as the level of polymer fines of the product is reduced and higher catalyst productivity is obtained.

The modifying compound (A) is at least one compound selected from the group consisting of carboxylic acids, carboxylic acid esters, ketones, acyl halides, aldehydes and alcohols. The modifying compound (A) may be represented by the general formula $R^3COOH$, $R^4COOR^5$, $R^6COR^7$, $R^8COX$, $R^9COH$ or $R^{10}OH$, wherein X is a halide atom and $R^3$, $R^4$, $R^5$, $R^6$, $R^7$, $R^8$, $R^9$ and $R^{10}$ are independently selected from a group of compounds comprising an alkyl group, alkenyl group, alkadienyl group, aryl group, alkaryl group, alkenylaryl group and an alkadienylaryl group and may have from 1 to 20 carbon atoms.

Suitable examples of the carboxylic acids include acetic acid, propionic acid, isopropionic acid, butyric acid, isobutyric acid, valeric acid, isovaleric acid, caproic acid, isocaproic acid, enanthic acid, isoenanthic acid, caprylic acid, isocaprylic acid, pelargonic acid, isopelargonic acid, capric acid, isocapric acid, cyclopentanecarboxylic acid, benzoic acid and mixtures thereof.

Suitable examples of carboxylic acid esters include methyl acetate, ethyl acetate, n-propyl acetate, isopropyl acetate, n-butyl acetate, isobutyl acetate, isoamyl acetate, ethyl butyrate, n-butyl butyrate and/or isobutyl butyrate.

Suitable examples of ketones include dimethyl ketone, diethyl ketone, methyl ethyl ketone, di-n-propyl ketone, di-n-butyl ketone, methyl n-propyl ketone, methyl isobutyl ketone, cyclohexanone, methyl phenyl ketone, ethyl phenyl ketone, n-propyl phenyl ketone, n-butyl phenyl ketone, isobutyl phenyl ketone, diphenyl ketone and mixtures thereof.

Suitable examples of acyl halides include ethanoyl chloride, propanoyl chloride, isopropanoyl chloride, n-butanoyl chloride, isobutanoyl chloride, benzoyl chloride and mixtures thereof.

Suitable examples of aldehydes include acetaldehyde, propionaldehyde, n-butyraldehyde, isobutyraldehyde, n-pentanaldehyde, isopentanaldehyde, n-hexanaldehyde, isohexanaldehyde, n-heptanaldehyde, benzaldehyde and mixtures thereof.

Suitable examples of alcohols include methanol, ethanol, n-propanol, isopropanol, n-butanol, isobutanol, sec-butanol, tert-butanol, cyclobutanol, n-pentanol, isopentanol, cyclopentanol, n-hexanol, isohexanol, cyclohexanol, n-octanol, isooctanol, 2-ethylhexanol, phenol, cresol, ethylene glycol, propylene glycol and mixtures thereof.

Preferably, the modifying compound (A) is at least one compound selected from the group comprising methyl n-propyl ketone, ethyl acetate, n-butyl acetate, acetic acid, isobutyric acid, isobutyraldehyde, ethanoyl chloride, ethanol and sec-butanol, and more preferably from methyl n-propyl ketone, n-butyl acetate, isobutyric acid and ethanoyl chloride as higher catalyst productivity and higher bulk density of the products are obtained and these compounds can be used to vary molecular weight distribution of the product.

The molar ratio of modifying compound (A) to magnesium in the solid support can be in a range of from about 0.01 to about 10.0, preferably of from about 0.1 to about 5.0, more preferably of from about 0.1 to about 3.5 and most preferably of from 0.3 to 2.5, as higher catalyst productivity and higher bulk density of the products are obtained. The modifying compound (A) may be added to the reaction product obtained in step (a), preferably by stirring, at a temperature of about 15° C. to about 140° C. for a duration of about 5 minutes to about 150 minutes, preferably at a temperature of 20° C. to 80° C. for a duration of 10 minutes to 100 minutes.

The modifying compound (B) is a silicon compound represented by the general formula $R^{11}{}_f(R^{12}O)_gSiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different. $R^{11}$ and $R^{12}$ are independently selected from the group of compounds comprising an alkyl group, alkenyl group, alkadienyl group, aryl group, alkaryl group, alkenylaryl group and an alkadienylaryl group. $R^{11}$ and $R^{12}$ may have from 1 to 20 carbon atoms.

Suitable silicon compounds include tetramethoxysilane, tetraethoxysilane, tetra-n-propoxysilane, tetraisopropoxysilane, tetra-n-butoxysilane, tetraisobutoxysilane, methyltrimethoxysilane, ethyltrimethoxysilane, n-propyltrimethoxysilane, isopropyltrimethoxysilane, n-butyltrimethoxysilane, isobutyltrimethoxysilane, n-pentyltrimethoxysilane, n-hexyltrimethoxysilane, n-octyltrimethoxysilane, isooctyltrimethoxysilane, vinyltrimethoxysilane, phenyltrimethoxysilane, dimethyldimethoxysilane, diethyldimethoxysilane, isobutylmethyldimethoxysilane, diisopropyldimethoxysilane, diisobutyldimethoxysilane, isobutylisopropyldimethoxysilane, dicyclopentyldimethoxysilane, cyclohexylmethyldimethoxysilane, phenylmethyldimethoxysilane, diphenyldimethoxysilane, trimethylmethoxysilane, triethylmethoxysilane, methyltriethoxysilane, ethyltriethoxysilane, n-propyltriethoxysilane, isopropyltriethoxysilane, n-butyltriethoxysilane, isobutyltriethoxysilane, n-pentyltriethoxysilane, n-hexyltriethoxysilane, n-octyltriethoxysilane, isooctyltriethoxysilane, vinyltriethoxysilane, phenyltriethoxysilane, dimethyldiethoxysilane, diethyldiethoxysilane, isobutylmethyldiethoxysilane, diisopropyldiethoxysilane, diisobutyldiethoxysilane, isobutylisopropyldiethoxy silane, dicyclopentyldiethoxysilane, cyclohexylmethyldiethoxysilane, phenylmethyldiethoxysilane, diphenyldiethoxysilane, trimethylethoxysilane, triethylethoxysilane, silicon tetrachloride, methyltrichlorosilane, ethyltrichlorosilane, n-propyltrichlorosilane, isopropyltrichlorosilane, n-butyltrichlorosilane, isobutyltrichlorosilane, n-pentyltrichlorosilane, n-hexyltrichlorosilane, n-octyltrichlorosilane, isooctyltrichlorosilane, vinyl ltrichlorosilane, phenyltrichlorosilane, dimethyldichlorosilane, diethyl dichlorosilane, isobutylmethyldichlorosilane, diisopropyldichlorosilane, diisobutyldichlorosilane, isobutylisopropyldichlorosilane, dicyclopentyldichloro silane, cyclohexylmethyldichlorosilane, phenylmethyldichlorosilane, diphenyldichlorosilane, trimethylchlorosilane, triethylchlorosilane, chloro trimethoxysilane, dichlorodimethoxysilane, trichloromethoxysilane, chloro triethoxysilane, dichlorodiethoxysilane and/or trichloroethoxysilane. Preferably, the modifying compound (B) used is tetraethoxysilane, n-propyltriethoxysilane, isobutyltrimethoxysilane, dimethyldichlorosilane, n-butyltrichlorosilane and silicon tetrachloride, and more preferably isobutyltrimethoxysilane, tetraethoxysilane, n-propyltriethoxysilane, n-butyltrichlorosilane and silicon tetrachloride as higher catalyst productivity and higher bulk density are obtained with the ability to vary the molecular weight distribution of the product by employing these preferred compounds.

The molar ratio of modifying compound (B) to magnesium may be in a range of from about 0.01 to about 5.0, preferably from about 0.01 to about 3.0, more preferably from about 0.01 to about 1.0 and most preferably from about 0.01 to about 0.3, as higher catalyst productivity and higher bulk density are obtained. The modifying compound (B) may be added to the reaction product obtained in step (a), preferably by stirring, at a temperature of about 15° C. to about 140° C. during about 5 minutes to about 150 minutes, preferably at a temperature of 20° C. to 80° C. during 10 minutes to 100 minutes.

The modifying compound (C) is a transition metal alkoxide represented by the general formula $(R^{13}O)_4M$, wherein M is a titanium atom, a zirconium atom or a vanadium atom, O is an oxygen atom and $R^{13}$ is a compound selected from the group of compounds comprising an alkyl group, alkenyl group, alkadienyl group, aryl group, alkaryl group, alkenylaryl group and an alkadienylaryl group. $R^{13}$ may have from 1 to 20 carbon atoms.

Suitable transition metal alkoxide compounds include titanium tetramethoxide, titanium tetraethoxide, titanium tetra-n-propoxide, titanium tetraisopropoxide, titanium tetra-n-butoxide, titanium tetraisobutoxide, titanium tetra-n-pentoxide, titanium tetraisopentoxide, titanium tetra-n-hexoxide, titanium tetra-n-heptoxide, titanium tetra-n-octoxide, titanium tetracyclohexoxide, titanium tetrabenzoxide, titanium tetraphenoxide, zirconium tetramethoxide, zirconium tetraethoxide, zirconium tetra-n-propoxide, zirconium tetraisopropoxide, zirconium tetra-n-butoxide, zirconium tetraisobutoxide, zirconium tetra-n-pentoxide, zirconium tetraisopentoxide, zirconium tetra-n-hexoxide, zirconium tetra-n-heptoxide, zirconium tetra-n-octoxide, zirconium tetracyclohexoxide, zirconium tetrabenzoxide, zirconium tetraphenoxide, vanadium tetramethoxide, vanadium tetraethoxide, vanadium tetra-n-propoxide, vanadium tetraisopropoxide, vanadium tetra-n-butoxide, vanadium tetraisobutoxide, vanadium tetra-n-pentoxide, vanadium tetraisopentoxide, vanadium tetra-n-hexoxide, vanadium tetra-n-heptoxide, vanadium tetra-n-octoxide, vanadium tetracyclohexoxide, vanadium tetrabenzoxide, vanadium tetraphenoxide or mixtures thereof. Preferably, titanium tetraethoxide, titanium tetra-n-butoxide and zirconium tetra-n-butoxide are used in present invention because higher catalyst productivity and higher bulk density are obtained with the ability to vary the molecular weight distribution of the product by employing these preferred compounds.

The molar ratio of the modifying compound (C) to magnesium may be in the range of from about 0.01 to about 5.0, preferably from about 0.01 to about 3.0, more preferably from about 0.01 to about 1.0 and most preferably from about 0.01 to about 0.3, as higher catalyst productivity, higher bulk density and improved hydrogen response in polymerization are obtained. The modifying compound (C) may be reacted, preferably by stirring, with the product obtained in step (a) at a temperature of about 15° C. to about 140° C. for a duration of about 5 minutes to about 150 minutes, preferably at a temperature of 20° C. to 80° C. for a duration of 10 minutes to 100 minutes.

The modifying compounds (A), (B) and (C) can be contacted in any order or simultaneously with the solid magnesium containing support obtained in step (a). Preferably, (A) is added first to the reaction product obtained in step (a) and then (B), followed by the addition of (C) as higher catalyst productivity and higher product bulk density are obtained by employing this order of adding the modifying compounds. Pre-mixtures of the individual catalyst components can also be effectively utilized in this invention.

Preferably, when modifying compound (A) is methyl n-propyl ketone and modifying compound (C) is titanium tetraethoxide, a further increase of molecular weight distribution is obtained when modifying compound (B) is selected in the following order from the group consisting of isobutyltrimethoxysilane, n-propyltriethoxysilane, tetraethoxysilane, n-butyltrichlorosilane and silicon tetrachloride, at the same levels of titanium halide compound.

In the preferred case when the modifying compound (B) is silicon tetrachloride and modifying compound (C) is titanium tetraethoxide, a further improved combination of catalyst productivity and bulk density is obtained when modifying compound (A) is selected in the following order from the group consisting of isobutyraldehyde, ethyl acetate, n-butyl acetate, methyl n-propyl ketone and isobutyric acid, at the same levels of titanium halide compound.

The titanium halide compound used in the present invention is represented by the general formula $TiX_4$, wherein Ti is a titanium atom and X is a halide atom.

Suitable titanium halide compounds include titanium tetrachloride, titanium tetrabromide, titanium tetrafluoride or mixtures thereof. The preferred titanium halide compound is titanium tetrachloride, as higher catalyst productivity is obtained. The molar ratio of the titanium halide compound to magnesium may be in the range of about 0.01 to about 10.0, preferably from about 0.01 to about 5.0 and more preferably from about 0.05 to about 1.0, as a better balance of high catalyst productivity and high bulk density is obtained.

The titanium halide compound may be added to the reaction mixture obtained by applying step (a) and step (b) in any conventional manner, such as by stirring, at a temperature of about 15° C. to about 140° C. for a duration of about 5 minutes to about 150 minutes, preferably at a temperature of 20° C. to 80° C. for a duration of 10 minutes to 100 minutes. The reaction mixture may be then dried using a nitrogen purge and/or by vacuum at a temperature from about 15° C. to about 140° C., preferably 30° C. to 100° C. and most preferably 50° C. to 80° C. to yield the final solid catalyst component.

The total molar ratio of the modifying compound (C) and the titanium halide compound to magnesium may be in the range of from about 0.01 to about 10.0, preferably of from about 0.01 to about 5.0 and more preferably of from about 0.05 to about 1.0, as a better balance of high catalyst productivity and high bulk density is obtained.

The total molar ratio of the modifying compound (C) and the titanium halide compound to hydroxyl (OH) groups in the support after dehydration may be in the range of from about 0.01 to about 10.0, preferably of from about 0.01 to about 5.0 and more preferably of from about 0.05 to about 1.0, as a better balance of high catalyst productivity and high bulk density is obtained. Higher levels would produce high catalyst productivity though with reduced bulk density, especially in a gas phase polymerization processes. Further, applying these amounts eliminates the requirement to conduct solvent decanting, solvent filtering, solvent washing steps in catalyst preparation and hence eliminates generation of highly hazardous solvent waste material.

The invention also relates to a solid catalyst component obtainable by the process as described herewith. The solid polymerization catalyst component shows a combination of higher productivity in ethylene polymerization and copolymerization process, higher bulk density and the molecular weight distribution of the ethylene polymers and copolymers can be controlled by applying this solid catalyst component.

Furthermore, the invention relates to a catalyst system comprising said solid catalyst component and a co-catalyst. The co-catalyst is typically an organometallic compound such as aluminum alkyls, aluminum alkyl hydrides, lithium aluminum alkyls, zinc alkyls, calcium alkyls, magnesium alkyls or mixtures thereof. Preferred co-catalysts are represented by the general formula $R^{14}{}_n AlX_{3-n}$, wherein X represents a halide atom; n represents an integer from 0 to 3; and $R^{14}$ is selected from a group of compounds comprising an alkyl group, alkenyl group, alkadienyl group, aryl group, alkaryl group, alkenylaryl group and alkadienylaryl group. $R^{14}$ may have from 1 to 20 carbon atoms. Suitable examples of the cocatalyst include trimethylaluminum, triethylaluminum, tri-isobutylaluminum, tri-n-hexylaluminum, tri-n-octylaluminum, diethylaluminum chloride, diisobutylaluminum chloride, ethylaluminium dichloride, isobutyl laluminum dichloride and mixtures thereof. Preferably, the cocatalyst is trimethylaluminum, triethylaluminum and/or tri-isobutylaluminum; and more preferably, the cocatalyst is triethylaluminum.

The cocatalyst may be used in a molar ratio of aluminum in the co-catalyst to titanium in the solid catalyst component of from about 1 to about 500, more preferably from 10 to 250, as high catalyst productivity is obtained.

The catalyst system according to the present invention can be applied in slurry, gas or solution phase conventional processes to obtain polyethylenes. These processes have already been described in the prior art and are thus well-known to the skilled person. Preferably, ethylene homopolymers and copolymers are produced by gas phase processes, such as stirred bed reactors and fluidized bed reactors or by slurry phase processes under polymerisation conditions already known in the art. Illustrative of gas phase processes are those disclosed for example in U.S. Pat. Nos. 4,302,565 and 4,302,566. A suitable example is a gas phase fluidized bed polymerization reactor fed by a dry or slurry solid catalyst feeder. The solid catalyst component may be introduced to the reactor in a site within the reaction zone to control the reactor production rate. The reactive gases, including ethylene and other alpha-olefins, hydrogen and nitrogen may be introduced to the reactor. The produced polymer may be discharged from the reaction zone through a discharge system. The bed of polymer particles in the reaction zone may be kept in fluidized state by a recycle stream that works as a fluidizing medium as well as to dissipate exothermal heat generated within the reaction zone. The reaction and compression heats can be removed from the recycle stream in an external heat exchange system in order to control the reactor temperature. Other means of heat removal from within the reactor can also be utilized, for example by the cooling resulting from vaporization of hydrocarbons such as isopentane, n-hexane or isohexane within the reactor. These hydrocarbons can be fed to the reactor as part of component reactant feeds and/or separately to the reactor to improve heat removal capacity from the reactor. The gas composition in the reactor can be kept constant to yield a polymer with the required specifications by feeding the reactive gases, hydrogen and nitrogen to make-up the composition of recycle stream.

Suitable operating conditions for the gas phase fluidized bed reactor typically include temperatures in the range of about 50° C. to about 115° C., more preferably from 70° C. to 110° C., an ethylene partial pressure from about 3 bar to 15 bar, more preferably from 5 bar to 10 bar and a total reactor pressure from about 10 bar to 40 bar, more preferably from 15 bar to 30 bar. The superficial velocity of the gas, resulting from the flow rate of recycle stream within reactor may be from about 0.2 m/s to about 1.2 m/s, more preferably 0.2 m/s to 0.9 m/s.

By applying the process and catalyst system according to the present invention ethylene homopolymers and copolymers, e.g. block and random copolymers can be produced. Examples of polyethylenes produced include homopolyethylene, linear low density polyethylene (LLDPE), medium density polyethylene (MDPE), high density polyethylene (HDPE) and very low density polyethylene (VLDPE); preferably, homopolyethylene, LLDPE, MDPE and HDPE are produced according to the present invention. Suitable examples of copolymers obtained according to the present invention may include ethylene copolymers with an alpha-olefin or di-olefin co-monomers, having from 3 to 20 carbon atoms, such as propylene, 1-butene, 1-pentene, 1-hexene, 1-octene, 4-methyl-1-pentene, 1,3-butadiene, 1,4-pentadiene, 1,5-hexadiene and mixtures thereof. Preferably, 1-butene and 1-hexene are used as co-monomers. The amount of the comonomer needed depend generally on the desired product properties and specific comonomer used. The skilled person can easily select the required amount to obtain the desired product. In general, the present invention provides a polymer composition containing 0 to about 30 wt. % of one or more comonomers and from about 70 to about 100 wt. % of ethylene units.

An ethylene homopolymer or copolymer with a melt index (MI) in the range of about 0.1 g/10 min to about 150 g/10 min, preferably 0.3 g/10 min to 80 g/10 min (measured by ASTM D1238 at a temperature of 190° C. and a load of 2.16 kg) can be obtained by using the catalyst system of present invention conventionally by varying the hydrogen to ethylene molar ratio; increasing the hydrogen to ethylene molar ratio generally leads to an increase in the melt index. Also, the melt index of the polymers can be varied by controlling the polymerization temperature and the density of the polymer obtained. A polymer density in the range of about 0.850 g/cm$^3$ to about 0.975 g/cm$^3$, more preferably 0.880 g/cm$^3$ to 0.970 g/cm$^3$ can be obtained using the catalyst system according to the present invention and by varying the comonomer to ethylene molar ratio; for instance, increasing the comonomer to ethylene molar ratio typically leads to a reduction in density. Lower ratios of hydrogen to ethylene and lower ratios of comonomer to ethylene can be used to attain the target melt index and target polymer density, respectively, reducing the cost requirement of the utilisation of hydrogen and comonomer.

The polyethylene compositions according to the present invention may for example be used in blown film extrusion, cast film extrusion, injection moulding and rotational moulding for producing articles such as, for example, shopping bags, shipping sacks, manual stretch wrap film, food wrap (cling film), ice bags, frozen food bags, pallet stretch wrap film, greenhouse film, lamination, screw closures, bottle caps, food containers, crates, trays, pails, shipping containers, industrial tanks, agricultural tanks, chemical shipping drums, carpet packing, trash containers and toys. The compositions may also contain additives such as for example lubricants, fillers, process stabilisers, antiblock, slip agents, UV stabilisers, antioxidants, compatibilizers, antistatic agents, processing aids and pigments.

EP 0244678 A1 discloses a process for the preparation of a solid catalyst component involving slurrying silica with n-butyl ether, reacting with n-BuMgCl, multiple washings with n-butyl ether and n-heptane, vacuum drying to obtain a solid intermediate and transferring to a separate vessel, treating the intermediate with n-heptane, and simultaneously Ti(OBu)$_4$ and Si(OEt)$_4$, reacting again with n-BuMgCl, multiple washings with n-heptane, vacuum drying to obtain a solid intermediate and transferring to a separate vessel, treating the intermediate with monochlorobenzene and diisobutyl phthalate, subjecting the reaction mixture to solid-liquid separation, multiple washings with n-heptane, treating with monochlorobenzene, n-butyl ether and titanium tetrachloride, subjecting the reaction mixture to solid-liquid separation, multiple washings with monochlorobenzene, treating again with monochlorobenzene, n-butyl ether and titanium tetrachloride, multiple washings with n-heptane and vacuum drying.

The solid catalyst component disclosed in EP 0244678 A1 is used to polymerize propylene homo or copolymers in the presence of AlEt$_3$ and phenyltriethoxysilane. EP 0244678 A1 does not relate to the production of an ethylene polymer and uses an excess of catalyst components during the process of catalyst preparation.

Further, multiple solvent washings with high levels of solvents, combined with the use of aromatic ester in catalyst preparation, generates high levels of hazardous solvent waste material. The catalyst synthesis steps of EP 0244678 A1 require a more complicated catalyst composition and process of preparation of the solid catalyst composition in comparison with the process according to the present invention.

Furthermore different silica dehydration temperatures are applied in EP 0244678 A1 as compared to the process according to the present invention.

EP 0244678 A1 discloses multiple different uses of n-butyl ether in the synthesis of the solid catalyst component being as a mixture with titanium tetrachloride, as a solvent for n-butyl magnesium chloride and for catalyst solvent washing steps. In contrast the process according to the present invention does not use an ether compound. EP 0244678 A1 discloses the use of two treatments with n-butyl magnesium chloride at different temperatures whereas only one treatment with di-n-butylmagnesium is used in the process according to the present invention. Interchange of n-butyl magnesium chloride and di-n-butylmagnesium in a catalyst composition is not straight forward, due to the significant difference in their reactivity with other components in the catalyst which produces different catalyst compositions. Furthermore excessive levels of n-butyl magnesium chloride are used in the process of EP 0244678 A1 as compared to di-n-butylmagnesium used in the process according to the present invention.

Another difference relates to the amount of Si(OEt)$_4$ in EP 0244678 A1 which is 3.69 mmol per gram of silica whereas in the process according to the present invention 0.10 mmol of the silicon compound per gram of silica is used. In contrast to the process of the present invention in EP 0244678 A1, Ti(OBu)$_4$ and Si(OEt)$_4$ are added simultaneously in the synthesis of the solid catalyst component, followed by the addition of diisobutyl phthalate and then a mixture of n-butyl ether and titanium tetrachloride whereas in the present invention the sequential addition, with reaction times for each individual component, in the order of carboxylic acids, carboxylic acid esters, ketones, acyl halides, aldehydes and alcohols followed by a silicon compound and then a transition metal (titanium, vanadium and zirconium) alkoxide compound and finally titanium tetrachloride is conducted.

A further difference relates to the use of the aromatic ester, diisobutyl phthalate in EP 0244678 A1 which is a concern in terms of generating hazardous solvent waste during washings and residues in the final polymer product. The process according to the present invention uses non aromatic esters such as ethyl acetate and n-butyl acetate, carboxylic acids, ketones, acyl halides, aldehydes and alcohols. Additionally the process according to the present invention does not use aromatic hydrocarbons or halogenated hydrocarbons. EP 0244678 A1 discloses multiple treatments of a mixture of an ether compound and titanium tetrachloride whereas the process according to the present invention does not use an ether compound and only single treatment with titanium tetrachloride is conducted.

The synthesis of the solid catalyst component of EP 0244678 A1 comprises 12 solvent washing steps with 3 different solvents, 2 intermediate drying and vessel transfer steps and 2 solid-liquid separation steps. Each of these steps is complicated, time consuming and expensive to conduct and produce high levels of highly hazardous solvent waste material especially due to the excessive levels of each catalyst component and the nature of diluents and solvents used in EP 0244678 A1. EP 0244678 A1 prefers washing steps with an excessive amount of an aromatic hydrocarbon solvent or a halogenated hydrocarbon solvent at least once at 50° C. to 120° C. and several times with an aliphatic hydrocarbon solvent. The process according to the present invention requires no solvent washings steps, intermediate drying and vessel transfer steps or solid-liquid separations.

EP 0032309 A2 discloses a complicated multi step process comprising a total of 25 solvent washing steps (each step using high solvent levels), 5 decanting steps, 3 filtering steps, 1 drying step and 3 re-suspending steps. This process for the preparation of a solid catalyst composition involves slurrying silica with isoparaffin fraction, reacting with an equimolar mixture of primary and secondary dibutylmagnesium, supernatant decanting, multiple washings with isoparaffin fraction, re-suspending in isoparaffin fraction, treating the intermediate with SiCl$_4$, supernatant decanting, multiple washings with isoparaffin fraction, filtering, treating the intermediate with ethylbenzoate in isoparaffin fraction, supernatant decanting, multiple washings with isoparaffin fraction, filtering, treating the intermediate with titanium tetrachloride, supernatant decanting, multiple washings with isoparaffin fraction at different temperatures, re-suspending in isoparaffin fraction, filtering, drying under vacuum, collecting a portion of the solid intermediate, transferring to a separate vessel and adding isoparaffin fraction, treating with Ti(OBu)$_4$, supernatant decanting, multiple washings with isoparaffin fraction and finally re-suspending in isoparaffin fraction. Each of said steps is complicated, time consuming and expensive to conduct and produce high levels of highly hazardous solvent waste material especially due to the excessive levels of each component and the nature of solvent used.

EP 0032309 A2 discloses the reaction of an equimolar mixture of primary and secondary dibutylmagnesium whereas the process according to the present invention uses MgR$^1$R$^2$ as defined in the description. Due to the different steric nature of the dibutylmagnesium, significantly different rates of reaction with other components of the catalyst and different resultant catalyst composition will be obtained when comparing EP 0032309 A2 and the process according to the present invention. EP 0032309 A2 discloses the direct reaction of a first component SiCl$_4$ with the addition of a second component dibutylmagnesium supported on silica for 60 hours at ambient temperature followed by 4 hours at 80° C. resulting in a chlorinated magnesium complex on silica. Also an excessive level of SiCl$_4$ is used in EP 0032309 A2 which will result in complete chlorination of the magnesium complex on silica. In EP 0032309 A2 ethylbenzoate is added after SiCl$_4$ addition. The requirement of this aromatic ester is a concern in terms of generating hazardous solvent waste during washings and residues in the final polymer product.

In the process according to the present invention a silicon compound is added after the reaction of carboxylic acids, carboxylic acid esters, ketones, acyl halides, aldehydes and alcohols directly with the di-n-butylmagnesium supported on silica, then the transition metal alkoxide compound is added and next titanium tetrachloride is added. These additions take place in one catalyst preparation vessel without any solvent washing steps, decanting steps, filtering steps, intermediate drying and vessel transfer steps or re-suspending steps. In the process according to the present invention the entire catalyst preparation process is conducted in one vessel.

Furthermore different silica dehydration temperatures are applied in EP 0032309 A2 as compared to the process according to the present invention.

The differences in catalyst preparation between EP 0032309 A2 and the present invention result in the formation of completely different catalyst compositions. Low catalyst productivity is obtained in polymerization in EP 0032309 A2.

EP 1052266 A1 discloses a process for the preparation of a solid catalyst component involving slurrying dehydrated (700° C. for 5 hours) silica with hexane, reacting with dibutylmagnesium at 50° C. for 1 hour, reacting with 1-butanol at 50° C. for 2 hours, reacting with silicon tetrachloride at 50° C. for 1 hour, reacting with titanium tetrachloride at 50° C. for 1 hour, removing solvent with a strong nitrogen flow and vacuum drying to obtain a solid catalyst component whereas in the process of the present invention in the catalyst preparation carboxylic acids, carboxylic acid esters, ketones, acyl halides, aldehydes and alcohols are reacted directly with di-n-butylmagnesium supported on silica, then the silicon compound is added, then the transition metal alkoxide compound is added and next titanium tetrachloride is added.

In EP 1052266 A1 a molar ratio of SiCl$_4$ to Mg of 0.66 is used whereas in the process according to the present invention the molar ratio of the silicon compound to Mg ranges most preferably between 0.01 and 0.3, as higher catalyst productivity and higher bulk density are obtained. Other differences relate to silica dehydration temperature, nature of solvent, higher level of catalyst components, longer reaction times and higher reaction temperatures in EP 1052266 A1 as compared to the process of the present invention in catalyst preparation.

The resulting LLDPE products of the process according to EP 1052266 A1 show a broad molecular weight distribution and a rather low productivity.

The invention will be elucidated by the following examples without being restricted thereby.

EXAMPLES

Silica was purchased from Grace Davison under the trade name of Sylopol 955 (mean particle diameter of 44 microns, a surface area of 303 m$^2$/g and a pore volume of 1.57 cm$^3$/g). Prior to use in catalyst preparation the silica was dehydrated by placing it in a vertical column, fluidizing under a nitrogen flow, gradually heating the column to 600° C., and then holding at that temperature for 4 hours, after which the silica was cooled to ambient temperature of about 25° C.

Two procedures were used for the determination of hydroxyl (OH) group content per gram of silica after dehydration:

One of the methods used to determine the hydroxyl group content in silica was based on the method described in J. J. Fripiat and J. Uytterhoeven, J. Phys. Chem. 66, 800, 1962. Dehydrated silica samples were treated with excess methylmagnesium iodide solution in tetrahydrofuran. To a flask connected to a digital pressure transducer were added 2.0 g of silica and 10.0 cm$^3$ of decahydronaphthalene. 2.0 cm$^3$ of a 3.0 molar solution of methylmagnesium iodide in tetrahydrofuran was then added to the flask and the content of the flasks was stirred for 30 minutes. All compounds additions were conducted under nitrogen atmosphere. The silica hydroxyl groups reacted with methylmagnesium iodide, producing an equal mole amount of methane; as a result, the pressure in the flask increased. The difference in initial pressure and pressure after reaction at a given temperature was measured and the resulted value was used to calculate the silica hydroxyl group content.

Another method used to determine the hydroxyl group content in silica was by $^1$H NMR spectroscopy on a Bruker 600 MHz NMR spectrometer, using a 5 mm probe at room temperature with deuterated tetrahydrofuran as solvent. Dehydrated silica samples were treated with excess benzyl magnesium chloride solution in tetrahydrofuran. 0.2 g of silica and 3.0 g of the benzyl magnesium chloride solution with a concentration of 1.0 wt. % were added into a vial under a nitrogen atmosphere. The vial was stirred for 30 minutes. The silica hydroxyl groups reacted with benzylmagnesium chloride producing an equal mole amount of toluene. The amount of the produced toluene was determined by $^1$H NMR spectroscopy and the silica hydroxyl group content was calculated based on the amount of toluene produced.

All the dehydrated silica samples employed in the examples were found to contain 0.90 to 1.00 mmol hydroxyl groups per gram of silica by both of the above silica hydroxyl group content analysis procedures.

Gel permeation chromatography (GPC) analysis was conducted on a Polymer Lab PL-220 instrument at 160° C. using a flow rate of 1.0 cm$^3$/min and 1,2,4-trichlorbenzene as the solvent in order to determine the number average molecular weight (Mn), weight average molecular weight (Mw) and molecular weight distribution (Mw/Mn) of the polymer resin.

Melt index (MI) of the polymer resin was measured according to ASTM D1238 at a temperature of 190° C. and a load of 2.16 kg.

Polymer density was measured using a density gradient column according to ASTM D2389.

Bulk density was measured according to ASTM D1895.

% Fines of the polymer was measured according to ASTM D1921.

1% Secant modulus was measured according to ASTM D882.

Tensile strength at break was measured according to ASTM D882.

Tensile elongation at break was measured according to ASTM D882.

Gloss (60° angle) was measured according to ASTM D2457.

Example 1

Synthesis of the Solid Catalyst Component X 2.5 g of Sylopol 955 silica which had been dehydrated at 600° C. for 4 hours under a nitrogen flow was placed in a 40 cm$^3$ flask. 15 cm$^3$ of isopentane was added to slurry the silica, then 2 5 mmol of di-n-butylmagnesium was added to the flask and the resultant mixture was stirred for 60 minutes at a temperature of 35° C. Then, 3.5 mmol of methyl n-propyl ketone was added to the flask and the resultant mixture was stirred for 60 minutes at a temperature of 35° C. Then, 0.25 mmol of tetraethoxysilane was added to the flask and the resultant mixture was stirred for 30 minutes at a temperature of 35° C. Next, 0.25 mmol of titanium tetraethoxide was added to the flask and the resultant mixture was stirred for 30 minutes at a temperature of 35° C. Subsequently, 1.50 mmol of titanium tetrachloride was added to the flask and the resultant mixture was stirred for 30 minutes at a temperature of 35° C. Finally, the slurry was dried using a nitrogen purge at 70° C. for 60 minutes to yield a free-flowing solid product.

Example 2

Polymerization

An autoclave reactor with a volume of 2.0 liters was purged with nitrogen at 130° C. for 30 minutes. After cooling to 55° C. the reactor was purged with hydrogen and then 1.0 liter of isopentane was introduced to the reactor. The reactor was then pressurized to 3.0 bar hydrogen pressure. Ethylene was introduced to the reactor such as to raise the reactor pressure to 20.0 bar and the reactor temperature was raised to 85° C. Then, 1.2 mmol of triethylaluminum, TEAL was then injected into the reactor. This was followed by injection of 50.0 mg of the solid catalyst component X after being slurried in 20 cm$^3$ of isopentane. Polymerization was carried out for 1 hour, with ethylene supplied on demand to maintain the total reactor pressure at 20.0 bar. 140 grams of homopolyethylene were recovered with a resin bulk density of 0.405 g/cm$^3$, a catalyst productivity of 2800 g PE/g catalyst, a Mn of 35402 g/mol, a Mw of 147119 g/mol and a MWD of 4.16.

Example 3

Synthesis of the Solid Catalyst Component Y

Example 1 was repeated except that 1.75 mmol of titanium tetrachloride was added.

Example 4

Polymerization

Example 2 was repeated except solid catalyst component Y was used. 170 grams of homopolyethylene were recovered with a resin bulk density of 0.416 g/cm$^3$, a catalyst productivity of 3400 g PE/g catalyst, a Mn of 29177 g/mol, a Mw of 124349 g/mol and a MWD of 4.26.

Example 5

Synthesis of the Solid Catalyst Component Z

Example 1 was repeated except that silicon tetrachloride (SiCl$_4$) was added instead of tetraethoxysilane (Si(OEt)$_4$).

Example 6

Polymerization

Example 2 was repeated except solid catalyst component Z was used. 150 grams of homopolyethylene were recovered with a resin bulk density of 0.381 g/cm$^3$, a catalyst productivity of 3000 g PE/g catalyst, a Mn of 25209 g/mol, a Mw of 127784 g/mol and a MWD of 5.07.

Example 7

Synthesis of the Solid Catalyst Component D

Example 5 was repeated except that 1.75 mmol of titanium tetrachloride was added.

Example 8

Polymerization

Example 2 was repeated except solid catalyst component D was used. 253 grams of homopolyethylene were recovered with a resin bulk density of 0.363 g/cm$^3$, a catalyst productivity of 5060 g PE/g catalyst, a Mn of 25692 g/mol, a Mw of 133859 g/mol and a MWD of 5.21.

Example 9

Synthesis of the Solid Catalyst Component E

Example 7 was repeated except that dimethyldichlorosilane (Me$_2$SiCl$_2$) was added instead of silicon tetrachloride.

Example 10

Polymerization

Example 2 was repeated except solid catalyst component E was used. 159 grams of homopolyethylene were recovered with a resin bulk density of 0.402 g/cm$^3$, a catalyst productivity of 3180 g PE/g catalyst, a Mn of 24151 g/mol, a Mw of 121935 g/mol and a MWD of 5.05.

Example 11

Synthesis of the Solid Catalyst Component F

Example 9 was repeated except that n-butyltrichlorosilane (n-BuSiCl$_3$) was added instead of dimethyldichlorosilane.

Example 12

Polymerization

Example 2 was repeated except solid catalyst component F was used. 164 grams of homopolyethylene were recovered with a resin bulk density of 0.420 g/cm$^3$, a catalyst productivity of 3280 g PE/g catalyst, a Mn of 32056 g/mol, a Mw of 150236 g/mol and a MWD of 4.69.

Example 13

Synthesis of the Solid Catalyst Component G

Example 11 was repeated except that isobutyltrimethoxysilane was added instead of n-butyltrichlorosilane.

Example 14

Polymerization

Example 2 was repeated except solid catalyst component G was used. 246 grams of homopolyethylene were recovered with a resin bulk density of 0.430 g/cm$^3$, a catalyst productivity of 4920 g PE/g catalyst, a Mn of 42793 g/mol, a Mw of 171173 g/mol and a MWD of 4.00.

Example 15

Synthesis of the Solid Catalyst Component H

Example 13 was repeated except that n-propyltriethoxysilane was added instead of isobutyltrimethoxysilane.

Example 16

Polymerization

Example 2 was repeated except solid catalyst component H was used. 165 grams of homopolyethylene were recovered with a resin bulk density of 0.424 g/cm$^3$, a catalyst productivity of 3300 g PE/g catalyst, a Mn of 31381 g/mol, a Mw of 125801 g/mol and a MWD of 4.01.

Example 17

Synthesis of the Solid Catalyst Component I

Example 3 was repeated except that titanium tetra-n-butoxide was added instead of titanium tetraethoxide.

Example 18

Polymerization

Example 2 was repeated except solid catalyst component I was used. 160 grams of homopolyethylene were recovered with a resin bulk density of 0.430 g/cm$^3$, a catalyst productivity of 3200 g PE/g catalyst, a Mn of 30644 g/mol, a Mw of 127434 g/mol and a MWD of 4.16.

Example 19

Synthesis of the Solid Catalyst Component J

Example 3 was repeated except that n-butyl acetate was added instead of metyl n-propyl ketone.

Example 20

Polymerization

Example 2 was repeated except solid catalyst component J was used. 163 grams of homopolyethylene were recovered with a resin bulk density of 0.367 g/cm$^3$, a catalyst productivity of 3260 g PE/g catalyst, a Mn of 42970 g/mol, a Mw of 185125 g/mol and a MWD of 4.31.

Example 21

Synthesis of the Solid Catalyst Component K

Example 19 was repeated except that silicon tetrachloride was added instead of tetraethoxysilane.

Example 22

Polymerization

Example 2 was repeated except solid catalyst component K was used. 214 grams of homopolyethylene were recovered with a resin bulk density of 0.378 g/cm$^3$, a catalyst productivity of 4280 g PE/g catalyst, a Mn of 27990 g/mol, a Mw of 170670 g/mol and a MWD of 6.10.

Example 23

Synthesis of the Solid Catalyst Component L

Example 21 was repeated except that ethyl acetate was added instead of n-butyl acetate.

Example 24

Polymerization

Example 2 was repeated except solid catalyst component L was used. 173 grams of homopolyethylene were recovered with a resin bulk density of 0.370 g/cm$^3$, a catalyst productivity of 3460 g PE/g catalyst, a Mn of 26027 g/mol, a Mw of 117615 g/mol and a MWD of 4.52.

Example 25

Synthesis of the Solid Catalyst Component M

Example 23 was repeated except that isobutyraldehyde was added instead of ethyl acetate.

Example 26

Polymerization

Example 2 was repeated except solid catalyst component M was used. 155 grams of homopolyethylene were recovered with a resin bulk density of 0.380 g/cm$^3$, a catalyst productivity of 3100 g PE/g catalyst, a Mn of 29957 g/mol, a Mw of 121536 g/mol and a MWD of 4.06.

Example 27

Synthesis of the Solid Catalyst Component N

Example 19 was repeated except that ethanoyl chloride was used instead of n-butyl acetate and 1.00 mmol of titanium tetrachloride was added.

Example 28

Polymerization

Example 2 was repeated except solid catalyst component N was used. 185 grams of homopolyethylene were recovered with a resin bulk density of 0.391 g/cm$^3$, a catalyst productivity of 3700 g PE/g catalyst, a Mn of 25543 g/mol, a Mw of 148403 g/mol and a MWD of 5.81.

Example 29

Synthesis of the Solid Catalyst Component O

Example 27 was repeated except that 1.50 mmol titanium tetrachloride was added.

Example 30

Polymerization

Example 2 was repeated except solid catalyst component 0 was used. 220 grams of homopolyethylene were recovered with a resin bulk density of 0.402 g/cm$^3$, a catalyst productivity of 4400 g PE/g catalyst, a Mn of 25615 g/mol, a Mw of 163568 g/mol and a MWD of 6.39.

Example 31

Synthesis of the Solid Catalyst Component P

Example 25 was repeated except that 1.5 mmol acetic acid was added instead of isobutyraldehyde.

Example 32

Polymerization
Example 2 was repeated except solid catalyst component P was used. 225 grams of homopolyethylene were recovered with a resin bulk density of 0.355 g/cm$^3$, a catalyst productivity of 4500 g PE/g catalyst, a Mn of 37466 g/mol, a Mw of 164144 g/mol and a MWD of 4.38.

Example 33

Synthesis of the Solid Catalyst Component Q
Example 15 was repeated except that isobutyric acid was added instead of methyl n-propyl ketone and titanium tetra-n-butoxide was added instead of titanium tetraethoxide.

Example 34

Polymerization
Example 2 was repeated except solid catalyst component Q was used. 164 grams of homopolyethylene were recovered with a resin bulk density of 0.425 g/cm$^3$, a catalyst productivity of 3280 g PE/g catalyst, a Mn of 38861 g/mol, a Mw of 153909 g/mol and a MWD of 3.96.

Example 35

Synthesis of the Solid Catalyst Component R
Example 25 was repeated except that isobutyric acid was added instead of isubutyraldehyde.

Example 36

Polymerization
Example 2 was repeated except solid catalyst component R was used. 262 grams of homopolyethylene were recovered with a resin bulk density of 0.404 g/cm$^3$, a catalyst productivity of 5240 g PE/g catalyst, a Mn of 28081 g/mol, a Mw of 130571 g/mol and a MWD of 4.65.

Example 37

Synthesis of the Solid Catalyst Component S
Example 11 was repeated except that ethanol was added instead of metyl n-propyl ketone.

Example 38

Polymerization
Example 2 was repeated except solid catalyst component S was used. 160 grams of homopolyethylene were recovered with a resin bulk density of 0.380 g/cm$^3$, a catalyst productivity of 3200 g PE/g catalyst, a Mn of 39565 g/mol, a Mw of 139533 g/mol and a MWD of 3.53.

Example 39

Synthesis of the Solid Catalyst Component T
Example 37 was repeated except that sec-butanol was added instead of ethanol.

Example 40

Polymerization
Example 2 was repeated except solid catalyst component T was used. 177 grams of homopolyethylene were recovered with a resin bulk density of 0.385 g/cm$^3$, a catalyst productivity of 3540 g PE/g catalyst, a Mn of 24880 g/mol, a Mw of 111309 g/mol and a MWD of 4.47.

Example 41

Synthesis of the Solid Catalyst Component U
Example 7 was repeated except that zirconium tetra-n-butoxide was added instead of titanium tetraethoxide.

Example 42

Polymerization
Example 2 was repeated except solid catalyst component U was used. 161 grams of homopolyethylene were recovered with a resin bulk density of 0.408 g/cm$^3$, a catalyst productivity of 3220 g PE/g catalyst, a Mn of 27951 g/mol, a Mw of 121852 g/mol and a MWD of 4.36.

Example 43

Synthesis of the Solid Catalyst Component V
Example 41 was repeated except that n-butyl acetate was added instead of metyl n-propyl ketone.

Example 44

Polymerization
Example 2 was repeated except solid catalyst component V was used. 175 grams of homopolyethylene were recovered with a resin bulk density of 0.388 g/cm$^3$, a catalyst productivity of 3500 g PE/g catalyst, a Mn of 34360 g/mol, a Mw of 135596 g/mol and a MWD of 3.95.

Example 45

Synthesis of the Solid Catalyst Component W
Example 39 was repeated except that zirconium tetra-n-butoxide was added instead of titanium tetraethoxide.

Example 46

Polymerization
Example 2 was repeated except solid catalyst component W was used. 221 grams of homopolyethylene were recovered with a resin bulk density of 0.387 g/cm$^3$, a catalyst productivity of 4420 g PE/g catalyst, a Mn of 32122 g/mol, a Mw of 127315 g/mol and a MWD of 3.96.

Comparative Example 1

Synthesis of the Solid Catalyst Component CE-1
2.5 g of Sylopol 955 silica that had been dehydrated at 600° C. for 4 hours under a nitrogen flow was placed in a 40 cm$^3$ flask. 15 cm$^3$ of isopentane was added to slurry the silica, then 2.5 mmol of di-n-butylmagnesium was added to the flask and the resultant mixture was stirred for 60 minutes at a temperature of 35° C. Then, 3.5 mmol of methyl n-propyl ketone was added to the flask and the resultant mixture was stirred for 60 minutes at a temperature of 35° C. Subsequently, 1.50 mmol of titanium tetrachloride was added to the flask and the resultant mixture was stirred for 30 minutes at a temperature of 35° C. Finally, the slurry was dried using a nitrogen purge at 70° C. for 60 minutes to yield a free-flowing solid product.

Comparative Example 2

Polymerization
An autoclave reactor with a volume of 2.0 liters was purged with nitrogen at 130° C. for 30 minutes. After cooling to 55°

C. the reactor was purged with hydrogen and then 1.0 liter of isopentane was introduced to the reactor. The reactor was then pressurized to 3.0 bar hydrogen pressure. Ethylene was introduced to the reactor such as to raise the reactor pressure to 20.0 bar and the reactor temperature was raised to 85° C. Then, 1.2 mmol of triethylaluminum, TEAL was injected into the reactor. This was followed by injection of 50.0 mg of the solid catalyst component CE-1 after being slurried in 20 cm$^3$ of isopentane. Polymerization was carried out for 1 hour, with ethylene being supplied on demand to maintain the total reactor pressure at 20.0 bar. 103 grams of homopolyethylene were recovered with a resin bulk density of 0.351 g/cm$^3$, a catalyst productivity of 2060 g PE/g catalyst, a Mn of 30331 g/mol, a Mw of 149471 g/mol and a MWD of 4.93.

Comparative Example 3

Synthesis of the Solid Catalyst Component CE-2

Comparative Example 1 was repeated except than 1.75 mmol TiCl$_4$ was used.

Comparative Example 4

Polymerization

Comparative Example 2 was repeated except that the solid catalyst component CE-2 was used. 142 grams of homopolyethylene were recovered with a resin bulk density of 0.356 g/cm$^3$, a catalyst productivity of 2840 g PE/g catalyst, a Mn of 26995 g/mol, a Mw of 125419 g/mol and a MWD of 4.65.

Comparative Example 5

Synthesis of the Solid Catalyst Component CE-3

Comparative Example 3 was repeated except that ethyl acetate was used instead of methyl n-propyl ketone.

Comparative Example 6

Polymerization

Comparative Example 2 was repeated except that the solid catalyst component CE-3 was used. 106 grams of homopolyethylene were recovered with a resin bulk density of 0.354 g/cm$^3$, a catalyst productivity of 2120 g PE/g catalyst, a Mn of 45912 g/mol, a Mw of 209785 g/mol and a MWD of 4.57.

Comparative Example 7

Synthesis of the Solid Catalyst Component CE-4

Comparative Example 5 was repeated except that isobutyric acid was used instead of ethyl acetate.

Comparative Example 8

Polymerization

Comparative Example 2 was repeated except that the solid catalyst component CE-4 was used. 112 grams of homopolyethylene were recovered with a resin bulk density of 0.351 g/cm$^3$, a catalyst productivity of 2240 g PE/g catalyst, a Mn of 39505 g/mol, a Mw of 146036 g/mol and a MWD of 3.70.

Comparative Example 9

Synthesis of the Solid Catalyst Component CE-5

Comparative Example 7 was repeated except that ethanol was used instead of isobutyric acid.

Comparative Example 10

Polymerization

Comparative Example 2 was repeated except that the solid catalyst component CE-5 was used. 138 grams of homopolyethylene were recovered with a resin bulk density of 0.262 g/cm$^3$, a catalyst productivity of 2760 g PE/g catalyst, a Mn of 39727 g/mol, a Mw of 160451 g/mol and a MWD of 4.04.

Comparative Example 11

Synthesis of Solid Catalyst Component (CE-6)

2.5 g of Sylopol 955 silica which had been dehydrated at 600° C. for 4 hours under a nitrogen flow was placed in a 40 cm$^3$ flask. 15 cm$^3$ of isopentane was added to slurry the silica, then 2.5 mmol of di-n-butylmagnesium was added to the flask and the resultant mixture was stirred for 60 minutes at a temperature of 35° C. Then, 0.25 mmol of tetraethoxysilane was added to the flask and the resultant mixture was stirred for 30 minutes at a temperature of 35° C. Subsequently, 1.75 mmol of titanium tetrachloride was added to the flask and the resultant mixture was stirred for 30 minutes at a temperature of 35° C. Finally, the slurry was dried using a nitrogen purge at 70° C. for 60 minutes to yield a free-flowing solid product.

Comparative Example 12

Polymerization

Comparative Example 2 was repeated except that the solid catalyst component CE-6 was added. 15 grams of homopolyethylene were recovered with a resin bulk density of 0.293 g/cm$^3$ and a catalyst productivity of 300 g PE/g catalyst.

Comparative Example 13

Synthesis of Solid Catalyst Component (CE-7)

2.5 g of Sylopol 955 silica which had been dehydrated at 600° C. for 4 hours under a nitrogen flow was placed in a 40 cm$^3$ flask. 15 cm$^3$ of isopentane was added to slurry the silica, then 2.5 mmol of di-n-butylmagnesium was added to the flask and the resultant mixture was stirred for 60 minutes at a temperature of 35° C. Then, 3.5 mmol of methyl n-propyl ketone was added to the flask and the resultant mixture was stirred for 60 minutes at a temperature of 35° C. Then, 0.25 mmol of tetraethoxysilane was added to the flask and the resultant mixture was stirred for 30 minutes at a temperature of 35° C. Subsequently, 1.75 mmol of titanium tetrachloride was added to the flask and the resultant mixture was stirred for 30 minutes at a temperature of 35° C. Finally, the slurry was dried using a nitrogen purge at 70° C. for 60 minutes to yield a free-flowing solid product.

Comparative Example 14

Polymerization

Comparative Example 2 was repeated except that the solid catalyst component CE-7 was added. 110 grams of homopolyethylene were recovered with a resin bulk density of 0.360 g/cm$^3$, a catalyst productivity of 2200 g PE/g catalyst, a Mn of 35705 g/mol, a Mw of 140763 g/mol and a MWD of 3.94.

Comparative Example 15

Synthesis of the Solid Catalyst Component CE-8

Comparative Example 13 was repeated except that ethanol was used instead of methyl n-propyl ketone.

Comparative Example 16

Polymerization

Comparative Example 2 was repeated except that the solid catalyst component CE-8 was used. 86 grams of homopolyethylene were recovered with a resin bulk density of 0.355 g/cm$^3$, a catalyst productivity of 1720 g PE/g catalyst, a Mn of 51177 g/mol, a Mw of 191206 g/mol and a MWD of 3.74.

Example 47

Scale-up Synthesis of the Solid Catalyst Component SS-1

A scale-up of solid catalyst component X described in Example 1 was conducted. 325 g of Sylopol 955 silica which had been dehydrated at 600° C. for 4 hours under a nitrogen flow was placed in a 10 liter flask. 1950 cm$^3$ of isopentane was added to slurry the silica, then 325.0 mmol of di-n-butylmagnesium was added to the flask and the resultant mixture was stirred for 60 minutes at a temperature of 35° C. Then, 455.0 mmol of methyl n-propyl ketone was added to the flask and the resultant mixture was stirred for 60 minutes at a temperature of 35° C. Then, 32.5 mmol of tetraethoxysilane was added to the flask and the resultant mixture was stirred for 30 minutes at a temperature of 35° C. Next, 32.5 mmol of titanium tetraethoxide was added to the flask and the resultant mixture was stirred for 30 minutes at a temperature of 35° C. Subsequently, 195.0 mmol of titanium tetrachloride was added to the flask and the resultant mixture was stirred for 30 minutes at a temperature of 35° C. Finally, the slurry was dried using a nitrogen purge at 70° C. for 3.5 hours to yield a free-flowing solid product.

Comparative Example 17

Synthesis of the Solid Catalyst Component CE-9

A scale-up of solid catalyst component CE-1 described in Comparative Example 1 was conducted. 320 g of Sylopol 955 silica which had been dehydrated at 600° C. for 4 hours under a nitrogen flow was placed in a 10 liter flask. 1920 cm$^3$ of isopentane was added to slurry the silica, then 320.0 mmol of di-n-butylmagnesium was added to the flask and the resultant mixture was stirred for 60 minutes at a temperature of 35° C. Then, 448.0 mmol of methyl n-propyl ketone was added to the flask and the resultant mixture was stirred for 60 minutes at a temperature of 35° C. Subsequently, 192.0 mmol of titanium tetrachloride was added to the flask and the resultant mixture was stirred for 30 minutes at a temperature of 35° C. Finally, the slurry was dried using a nitrogen purge at 70° C. for 3.5 hours to yield a free-flowing solid product.

Example 48

Scale-up Synthesis of Solid Catalyst Component SS-2

A scale-up of solid catalyst component Y described in Example 3 was conducted. 340 g of Sylopol 955 silica which had been dehydrated at 600° C. for 4 hours under a nitrogen flow was placed in a 10 liter flask. 2040 cm$^3$ of isopentane was added to slurry the silica, then 340.0 mmol of di-n-butylmagnesium was added to the flask and the resultant mixture was stirred for 60 minutes at a temperature of 35° C. Then, 476.0 mmol of methyl n-propyl ketone was added to the flask and the resultant mixture was stirred for 60 minutes at a temperature of 35° C. Then, 34.0 mmol of tetraethoxysilane was added to the flask and the resultant mixture was stirred for 30 minutes at a temperature of 35° C. Next, 34.0 mmol of titanium tetraethoxide was added to the flask and the resultant mixture was stirred for 30 minutes at a temperature of 35° C. Subsequently, 238.0 mmol of titanium tetrachloride was added to the flask and the resultant mixture was stirred for 30 minutes at a temperature of 35° C. Finally, the slurry was dried using a nitrogen purge at 70° C. for 3.5 hours to yield a free-flowing solid product.

Examples 49 to 52 and Comparative Examples 18 and 19

Polymerization

Solid catalyst component SS-1, solid catalyst component SS-2 and solid catalyst component CE-9 were used for the synthesis of 1-butene linear low density polyethylene (LLDPE) with a melt index of 1.0 g/10 min and a polymer density of 0.918 g/cm$^3$ in a fluidized bed gas phase polymerization reactor. The fluidized bed gas phase polymerization reactor had a 45 cm internal diameter and was operated with a 140 cm reaction zone height. The solid catalyst component was fed to the reactor using a dry solid catalyst feeder to maintain a production rate at 10 kg per hour. Ethylene, 1-butene, hydrogen and nitrogen were introduced to the reactor to yield polymer with the required specifications. 5 wt. % triethylaluminum (co-catalyst) solution in isopentane was continuously introduced to the reactor at a feed rate 0.08 kg per hour. The reactor temperature was maintained at 86° C., ethylene partial pressure at 7.0 bar, total reactor pressure at 20.7 bar and superficial gas velocity at 0.42 m/s. Each of the above solid catalyst components were ran for three consecutive days in the fluidized bed gas phase polymerization reactor and corresponding polymerization data is reported in Table 4.

200 ppm of Irganox 1076, 500 ppm of zinc stearate and 800 ppm of Weston 399 were added as additives in a Henschel mixer and mixed for 5 minutes together with 25 kg of the 1-butene linear low density polyethylene resin produced using solid catalyst component SS-1, solid catalyst component SS-2 and solid catalyst component CE-9. The compounded material was pelletized using a ZSK-30 twin-screw extruder under the following conditions: a temperature profile of 130° C. to 210° C., screw speed of 200 rpm, screw diameter of 30 mm, screw length to diameter ratio of 26 and an output rate of 20 kg per hour. The obtained pellets were converted to 25 micron blown film using a Batenfield machine under the following conditions: a temperature profile of 190° C. to 200° C., a screw speed of 60 rpm, a screw diameter of 60 mm, screw length to diameter ratio of 27, a die gap of 2.3 mm, a frost line height of 40 cm, a blow-up ratio (BUR) of 2.5:1 and an output rate of 58 kg per hour. Evaluation of film product obtained using solid catalyst component SS-1, solid catalyst component SS-2 and solid catalyst component CE-9 is reported in Table 5.

The solid catalyst components obtained in the Examples show a combination of higher catalyst productivity and higher bulk density of ethylene polymers and copolymers, with simultaneous control in molecular weight distribution.

In addition to advantages of the catalyst shown for slurry polymerization, the combination of higher catalyst productivity and higher bulk density is also observed in gas phase fluidized bed polymerization (see Table 4). Further, a lower level of polymer fines, a lower molar ratio hydrogen to ethylene and a lower molar ratio of 1-butene to ethylene is used to attain polymer with a melt index of 1.0 g/10 min and density of 0.918 g/cm³ (see Examples 49 and 50 vs. Comparative Example 18, Table 4). Corresponding blown film product characterization showed improved stiffness (measured by 1% secant modulus) in the machine direction (MD) and transverse direction (TD), improved tensile strength at break in the machine direction (MD) and transverse direction (TD), improved % tensile elongation at break in the machine direction (MD) and transverse direction (TD) and improved gloss (60° angle) (see Examples 51 and 52 vs. Comparative Example 19, Table 5).

TABLE 1

| Example | Cat. | Silica g | Bu₂Mg mmol | Modifying compound (A) mmol | Modifying compound (A) compound | Modifying compound (B) mmol | Modifying compound (B) compound | Modifying compound (C) mmol | Modifying compound (C) compound | TiCl₄ mmol |
|---|---|---|---|---|---|---|---|---|---|---|
| 1 | X | 2.5 | 2.5 | 3.5 | methyl n-propyl ketone | 0.25 | Si(OEt)₄ | 0.25 | Ti(OEt)₄ | 1.50 |
| 3 | Y | 2.5 | 2.5 | 3.5 | methyl n-propyl ketone | 0.25 | Si(OEt)₄ | 0.25 | Ti(OEt)₄ | 1.75 |
| 5 | Z | 2.5 | 2.5 | 3.5 | methyl n-propyl ketone | 0.25 | SiCl₄ | 0.25 | Ti(OEt)₄ | 1.50 |
| 7 | D | 2.5 | 2.5 | 3.5 | methyl n-propyl ketone | 0.25 | SiCl₄ | 0.25 | Ti(OEt)₄ | 1.75 |
| 9 | E | 2.5 | 2.5 | 3.5 | methyl n-propyl ketone | 0.25 | Me₂SiCl₂ | 0.25 | Ti(OEt)₄ | 1.75 |
| 11 | F | 2.5 | 2.5 | 3.5 | methyl n-propyl ketone | 0.25 | n-BuSiCl₃ | 0.25 | Ti(OEt)₄ | 1.75 |
| 13 | G | 2.5 | 2.5 | 3.5 | methyl n-propyl ketone | 0.25 | IsoBuSi(OMe)₃ | 0.25 | Ti(OEt)₄ | 1.75 |
| 15 | H | 2.5 | 2.5 | 3.5 | methyl n-propyl ketone | 0.25 | n-PrSi(OEt)₃ | 0.25 | Ti(OEt)₄ | 1.75 |
| 17 | I | 2.5 | 2.5 | 3.5 | methyl n-propyl ketone | 0.25 | Si(OEt)₄ | 0.25 | Ti(OBu)₄ | 1.75 |
| 19 | J | 2.5 | 2.5 | 3.5 | n-butyl acetate | 0.25 | Si(OEt)₄ | 0.25 | Ti(OEt)₄ | 1.75 |
| 21 | K | 2.5 | 2.5 | 3.5 | n-butyl acetate | 0.25 | SiCl₄ | 0.25 | Ti(OEt)₄ | 1.75 |
| 23 | L | 2.5 | 2.5 | 3.5 | ethyl acetate | 0.25 | SiCl₄ | 0.25 | Ti(OEt)₄ | 1.75 |
| 25 | M | 2.5 | 2.5 | 3.5 | isobutyraldehyde | 0.25 | SiCl₄ | 0.25 | Ti(OEt)₄ | 1.75 |
| 27 | N | 2.5 | 2.5 | 3.5 | ethanoyl chloride | 0.25 | Si(OEt)₄ | 0.25 | Ti(OEt)₄ | 1.00 |
| 29 | O | 2.5 | 2.5 | 3.5 | ethanoyl chloride | 0.25 | Si(OEt)₄ | 0.25 | Ti(OEt)₄ | 1.50 |
| 31 | P | 2.5 | 2.5 | 1.5 | acetic acid | 0.25 | SiCl₄ | 0.25 | Ti(OEt)₄ | 1.75 |
| 33 | Q | 2.5 | 2.5 | 3.5 | isobutyric acid | 0.25 | n-PrSi(OEt)₃ | 0.25 | Ti(OBu)₄ | 1.75 |
| 35 | R | 2.5 | 2.5 | 3.5 | isobutyric acid | 0.25 | SiCl₄ | 0.25 | Ti(OEt)₄ | 1.75 |
| 37 | S | 2.5 | 2.5 | 3.5 | ethanol | 0.25 | n-BuSiCl₃ | 0.25 | Ti(OEt)₄ | 1.75 |
| 39 | T | 2.5 | 2.5 | 3.5 | sec-butanol | 0.25 | n-BuSiCl₃ | 0.25 | Ti(OEt)₄ | 1.75 |
| 41 | U | 2.5 | 2.5 | 3.5 | methyl n-propyl ketone | 0.25 | SiCl₄ | 0.25 | Zr(OBu)₄ | 1.75 |
| 43 | V | 2.5 | 2.5 | 3.5 | n-butyl acetate | 0.25 | SiCl₄ | 0.25 | Zr(OBu)₄ | 1.75 |
| 45 | W | 2.5 | 2.5 | 3.5 | sec-butanol | 0.25 | n-BuSiCl₃ | 0.25 | Zr(OBu)₄ | 1.75 |

TABLE 2

| Comparative Example | Cat. | Silica g | Bu₂Mg mmol | Modifying compound (A) mmol | Modifying compound (A) compound | Modifying compound (B) mmol | Modifying compound (B) compound | Modifying compound (C) mmol | Modifying compound (C) compound | TiCl₄ mmol |
|---|---|---|---|---|---|---|---|---|---|---|
| 1 | CE-1 | 2.5 | 2.5 | 3.5 | methyl n-propyl ketone | — | — | — | — | 1.50 |
| 3 | CE-2 | 2.5 | 2.5 | 3.5 | methyl n-propyl ketone | — | — | — | — | 1.75 |
| 5 | CE-3 | 2.5 | 2.5 | 3.5 | ethyl acetate | — | — | — | — | 1.75 |
| 7 | CE-4 | 2.5 | 2.5 | 3.5 | isobutyric acid | — | — | — | — | 1.75 |
| 9 | CE-5 | 2.5 | 2.5 | 3.5 | ethanol | — | — | — | — | 1.75 |
| 11 | CE-6 | 2.5 | 2.5 | — | — | 0.25 | Si(OEt)₄ | — | — | 1.75 |
| 13 | CE-7 | 2.5 | 2.5 | 3.5 | methyl n-propyl ketone | 0.25 | Si(OEt)₄ | — | — | 1.75 |
| 15 | CE-8 | 2.5 | 2.5 | 3.5 | ethanol | 0.25 | Si(OEt)₄ | — | — | 1.75 |

TABLE 3

| Example | Cat. | Productivity gPE/g catalyst | Bulk Density g/cm³ | Mn g/mol | Mw g/mol | MWD |
|---|---|---|---|---|---|---|
| 2 | X | 2800 | 0.405 | 35402 | 147119 | 4.16 |
| 4 | Y | 3400 | 0.416 | 29177 | 124349 | 4.26 |
| 6 | Z | 3000 | 0.381 | 25209 | 127784 | 5.07 |
| 8 | D | 5060 | 0.363 | 25692 | 133859 | 5.21 |
| 10 | E | 3180 | 0.402 | 24151 | 121935 | 5.05 |
| 12 | F | 3280 | 0.420 | 32056 | 150236 | 4.69 |
| 14 | G | 4920 | 0.430 | 42793 | 171173 | 4.00 |
| 16 | H | 3300 | 0.424 | 31381 | 125801 | 4.01 |
| 18 | I | 3200 | 0.430 | 30644 | 127434 | 4.16 |
| 20 | J | 3260 | 0.367 | 42970 | 185125 | 4.31 |
| 22 | K | 4280 | 0.378 | 27990 | 170670 | 6.10 |
| 24 | L | 3460 | 0.370 | 26027 | 117615 | 4.52 |
| 26 | M | 3100 | 0.380 | 29957 | 121536 | 4.06 |
| 28 | N | 3700 | 0.391 | 25543 | 148403 | 5.81 |

TABLE 3-continued

| | Cat. | Productivity gPE/g catalyst | Bulk Density g/cm$^3$ | Mn g/mol | Mw g/mol | MWD |
|---|---|---|---|---|---|---|
| 30 | O | 4400 | 0.402 | 25615 | 163568 | 6.39 |
| 32 | P | 4500 | 0.355 | 37466 | 164144 | 4.38 |
| 34 | Q | 3280 | 0.425 | 38861 | 153909 | 3.96 |
| 36 | R | 5240 | 0.404 | 28081 | 130571 | 4.65 |
| 38 | S | 3200 | 0.380 | 39565 | 139533 | 3.53 |
| 40 | T | 3540 | 0.385 | 24880 | 111309 | 4.47 |
| 42 | U | 3220 | 0.408 | 27951 | 121852 | 4.36 |
| 44 | V | 3500 | 0.388 | 34360 | 135596 | 3.95 |
| 46 | W | 4420 | 0.387 | 32122 | 127315 | 3.96 |
| Comparative Example | | | | | | |
| 2 | CE-1 | 2060 | 0.351 | 30331 | 149471 | 4.93 |
| 4 | CE-2 | 2840 | 0.356 | 26995 | 125419 | 4.65 |
| 6 | CE-3 | 2120 | 0.354 | 45912 | 209785 | 4.57 |
| 8 | CE-4 | 2240 | 0.351 | 39505 | 146036 | 3.70 |
| 10 | CE-5 | 2760 | 0.262 | 39727 | 160451 | 4.04 |
| 12 | CE-6 | 300 | 0.293 | — | — | — |
| 14 | CE-7 | 2200 | 0.360 | 35705 | 140763 | 3.94 |
| 16 | CE-8 | 1720 | 0.355 | 51177 | 191206 | 3.74 |

TABLE 4

| | Cat. | Hydrogen to Ethylene Molar ratio | 1-Butene to Ethylene Molar ratio | Fines % <125 microns | Productivity g PE/g catalyst | Bulk Density g/cm$^3$ |
|---|---|---|---|---|---|---|
| Example 49 | SS-1 | 0.12 | 0.40 | 0.12 | 4210 | 0.350 |
| Example 50 | SS-2 | 0.11 | 0.41 | 0.03 | 6316 | 0.346 |
| Comparative Example 18 | CE-9 | 0.18 | 0.42 | 0.18 | 2580 | 0.320 |

TABLE 5

| | | 1% Secant Modulus MPa | | Tensile Strength at Break MPa | | % Tensile Elongation at Break MPa | | Gloss (60° angle) |
|---|---|---|---|---|---|---|---|---|
| | Cat. | MD | TD | MD | TD | MD | TD | % |
| Example 51 | SS-1 | 197.1 | 223.9 | 50.6 | 42.3 | 758 | 914 | 92.2 |
| Example 52 | SS-2 | 188.0 | 216.8 | 43.2 | 35.8 | 832 | 1090 | 92.9 |
| Comparative Example 19 | CE-9 | 135.7 | 154.0 | 38.7 | 34.5 | 637 | 867 | 84.4 |

The invention claimed is:

1. A process for preparing a solid catalyst component suitable for producing polyethylene and its copolymers, said process comprising:
    (a) forming a first product by contacting a dehydrated support having hydroxyl groups with a magnesium compound having the general formula MgR$^1$R$^2$, wherein R$^1$ and R$^2$ are the same or different and are independently selected from the group comprising an alkyl group, alkenyl group, alkadienyl group, aryl group, alkaryl group, alkenylaryl group and alkadienylaryl group;
    (b) contacting the first product with modifying compounds (A), (B) and (C), to form a second product, wherein:
        (A) is at least one compound selected from the group consisting of carboxylic acid, carboxylic acid ester, ketone, acyl halide, aldehyde and alcohol;
        (B) is a compound having the general formula R$^{11}_f$(R$^{12}$O)$_g$SiX$_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and R$^{11}$ and R$^{12}$ are the same or different and are independently selected from the group comprising an alkyl group, alkenyl group, alkadienyl group, aryl group, alkaryl group, alkenylaryl group and alkadienylaryl group;
        (C) is a compound having the general formula (R$^{13}$O)$_4$M, wherein M is a titanium atom, a zirconium atom or a vanadium atom, O is an oxygen atom and R$^{13}$ is selected from the group comprising an alkyl group, alkenyl group, alkadienyl group, aryl group, alkaryl group, alkenylaryl group and alkadienylaryl group; and
    (c) contacting the second product with a titanium halide compound having the general formula TiX$_4$, wherein Ti is a titanium atom and X is a halide atom, to form the solid catalyst component, wherein the total molar ratio of compound (C) and TiX$_4$ to hydroxyl groups is from 0.05 to 1.0.

2. The process according to claim 1, wherein the molar ratio of Mg to hydroxyl groups is from 0.01 to 10.

3. The process according to claim 1, wherein the molar ratio of compound (A) to Mg is from 0.01 to 10.

4. The process according to claim 1, wherein the molar ratio of compound (B) to Mg is from 0.01 to 5.

5. The process according to claim 1, wherein the molar ratio of compound (C) to Mg is from 0.01 to 5.

6. The process according to claim 1, wherein the molar ratio of titanium halide compound to Mg is from 0.01 to 10.

7. The process according to claim 1, wherein the support is silica, alumina, magnesia, thoria, zirconia or mixtures thereof.

8. The process according to claim 1, wherein the support is silica.

9. The process according to claim 1, wherein compound (A) is selected from methyl n-propyl ketone, ethyl acetate, n-butyl acetate, acetic acid, isobutyric acid, isobutyraldehyde, ethanoyl chloride, ethanol and sec-butanol.

10. The process according to claim 1, wherein compound (B) is selected from tetraethoxysilane, n-propyltriethoxysilane, isobutyltrimethoxysilane, dimethyldichlorosilane, n-butyltrichlorosilane and silicon tetrachloride.

11. The process according to claim 1, wherein compound (C) is selected from titanium tetraethoxide, titanium tetra-n-butoxide and zirconium tetra-n-butoxide.

12. The process according to claim 1, wherein TiX$_4$ compound is TiCl$_4$.

13. A solid catalyst component obtained by the process according to claim 1.

14. A process for producing polyethylene and its copolymers in the presence of the solid catalyst component according to claim 13 and a co-catalyst.

15. An ethylene homopolymer or ethylene copolymer produced by the process of claim 14.

16. A film comprising the ethylene homopolymers or ethylene copolymers according to claim 15.

17. An article comprising the ethylene homopolymers or ethylene copolymers according to claim 15.

18. A process for preparing a solid catalyst component suitable for producing polyethylene and its copolymers, said process comprising:
    (a) forming a first product by contacting a dehydrated support having hydroxyl groups with a magnesium compound having the general formula MgR$^1$R$^2$, wherein R$^1$ and R$^2$ are the same or different and are independently selected from the group comprising an alkyl group, alkenyl group, alkadienyl group, aryl group, alkaryl group, alkenylaryl group and alkadienylaryl group;
(b) contacting the first product with modifying compounds (A), (B) and (C), to form a second product, wherein:
(A) is at least one compound selected from the group consisting of carboxylic acid, carboxylic acid ester, ketone, acyl halide, aldehyde and alcohol;
(B) is a compound having the general formula $R^{11}{}_f(R^{12}O)_g SiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different and are independently selected from the group comprising an alkyl group, alkenyl group, alkadienyl group, aryl group, alkaryl group, alkenylaryl group and alkadienylaryl group;
(C) is a compound having the general formula $(R^{13}O)_4 M$, wherein M is a titanium atom, a zirconium atom or a vanadium atom, O is an oxygen atom and $R^{13}$ is selected from the group comprising an alkyl group, alkenyl group, alkadienyl group, aryl group, alkaryl group, alkenylaryl group and alkadienylaryl group; and
(c) contacting the second product with a titanium halide compound having the general formula $TiX_4$, wherein Ti is a titanium atom and X is a halide atom, to form the solid catalyst component;
wherein the molar ratio of Mg to hydroxyl groups is from 0.01 to 10;
wherein the molar ratio of compound (A) to Mg is from 0.01 to 10;
wherein the molar ratio of compound (B) to Mg is from 0.01 to 5;
wherein the molar ratio of compound (C) to Mg is from 0.01 to 5; and
wherein the molar ratio of titanium halide compound to Mg is from 0.01 to 10; and
wherein the total molar ratio of compound (C) and $TiX_4$ to hydroxyl groups is from 0.05 to 1.0.

* * * * *